(12) United States Patent
de Bruijn

(10) Patent No.: US 7,918,996 B1
(45) Date of Patent: Apr. 5, 2011

(54) STORMWATER FILTER BAG

(76) Inventor: Hans de Bruijn, Lancaster, PA (US)

(*) Notice: Subject to any disclaimer, the term of this patent is extended or adjusted under 35 U.S.C. 154(b) by 121 days.

(21) Appl. No.: 12/462,541

(22) Filed: Aug. 5, 2009

Related U.S. Application Data

(60) Provisional application No. 61/191,484, filed on Sep. 8, 2008.

(51) Int. Cl.
*B01D 29/23* (2006.01)

(52) U.S. Cl. ........... 210/170.03; 210/323.2; 210/487; 210/488; 210/492; 210/493.3; 405/43; 405/46; 405/50

(58) Field of Classification Search ........... 210/170.03, 210/170.08, 323.2, 487, 488, 492, 493.1, 210/493.3; 405/36, 43, 46, 50
See application file for complete search history.

(56) References Cited

U.S. PATENT DOCUMENTS

| | | | | |
|---|---|---|---|---|
| 3,060,693 A | * | 10/1962 | Taylor | 210/170.08 |
| 4,799,822 A | * | 1/1989 | Wintermantel et al. | 405/46 |
| 5,516,229 A | * | 5/1996 | Atchley et al. | 405/43 |
| 5,520,481 A | * | 5/1996 | Atchley et al. | 210/170.08 |
| 5,562,825 A | * | 10/1996 | Yamada et al. | 210/493.4 |
| 5,597,264 A | * | 1/1997 | Laak | 210/170.08 |
| 5,639,364 A | * | 6/1997 | Houck et al. | 405/50 |
| 5,730,878 A | | 3/1998 | Rice | |
| 5,810,510 A | | 9/1998 | Urriola | |
| 5,820,646 A | * | 10/1998 | Gillingham et al. | 55/488 |
| 6,214,216 B1 | | 4/2001 | Isaacson | |
| 6,306,293 B1 | | 10/2001 | Schilling et al. | |
| 6,875,350 B2 | * | 4/2005 | Allard | 210/170.03 |
| 7,632,408 B1 | * | 12/2009 | Everson | 210/170.08 |
| 2004/0253054 A1 | * | 12/2004 | Atchley | 405/43 |
| 2005/0269253 A1 | * | 12/2005 | Potts | 210/170 |
| 2006/0163150 A1 | * | 7/2006 | Golden et al. | 210/493.1 |

* cited by examiner

*Primary Examiner* — Christopher Upton
(74) *Attorney, Agent, or Firm* — Martin Fruitman

(57) ABSTRACT

The invention is a particle and sediment filter for stormwater. A long permeable filter bag is laid out horizontally within an enclosure. The bag is formed of at least two layers of parallel tubes that give each layer the pleated look of a typical air mattress. Stormwater is collected from the filter bag by perforated pipes held within the creases between the tubes of the layers of the bag, with the pipes draining to the outside of the enclosure. The bag is also supported above the bottom of the enclosure by additional perforated pipes located within the creases between the tubes, thus allowing the filtered liquid to also drain off beneath the bag. The stormwater input is from a pipe that feeds a manifold formed in the bag and connected to each tube. The top of the enclosure is removable for replacing the filter. The filter bags are constructed of flexible material so that they are flat during initial transport and installation, but they expand as they are filled with liquid and solid material. An assembly of the bags also includes straps for holding the perforated pipes in place against the tubes and for lifting the bag with trapped sediment.

10 Claims, 3 Drawing Sheets

US 7,918,996 B1

STORMWATER FILTER BAG

This application claims the benefit of provisional patent application 61/191,484 filed Sep. 8, 2008.

BACKGROUND OF THE INVENTION

This invention deals generally with a sediment filter for stormwater and more specifically with a permeable filter cloth bag sewn to form layers of parallel tubes of filter cloth that give each layer the pleated look of a typical air mattress.

Stormwater bag-type filters within enclosures are quite useful because they facilitate the trapping and disposal of contaminants and sediment in runoff from streets, parking lots, and other surfaces. In such an arrangement, the full filter bag can be removed from its enclosure, replaced by a fresh filter bag, and the full filter with its trapped material can be disposed of properly. However, a major problem with bag-type stormwater filters is the tendency of the top cloth surfaces of such filter bags to float upon the accumulation of water within the bag and raise these surfaces to virtually the same level as the water level in the flowing stream. This results in insufficient water pressure to move liquid through the filter and can also cause premature bypassing of the filter bag through the typical bypass structure, thus completely negating the filter action. Another problem with bag-type filters is the large "footprint" required for the enclosure relative to the amount of active filter area. The typical bag-type filter requires a footprint of approximately one-half the active filter area, which requires large structures for the enclosures. It would be very beneficial to have bag-type stormwater filters that operated consistently and included large active surface areas within smaller enclosures.

SUMMARY OF THE INVENTION

About 80% of the population lives near water where the shore communities create run-off in land areas that have only a mild descent towards the rivers, lakes and oceans. The natural head pressures in collection systems are relatively small compared to systems where mechanical pumps can pressurize the water. Filter surfaces require pressurization of the water in order to permeate the filter. Thus it behooves an efficient filter system to bring much surface area into the relatively small height between the influent pipe and effluent pipe. Sewn internal connections between filter surfaces provide the retaining forces that keep the assembly flat, yet provide collection space for the filter cake and distribution pathways to the filter surfaces. The horizontal layering of draining and filter surfaces within close proximity of each other is the key to maximizing filter capacity under virtually equal pressure. A compact system is also relatively simple to transport in new condition and relatively simple to remove in post use condition.

The present invention overcomes the problems of floating bags and oversize enclosures for stormwater bag filters by forming the bags into multiple layers that are sewn into parallel tubes separated by creases and resembling a typical air mattress. The sewn creases create an internal tension load that keeps the filter surfaces within close proximity as the pressurized water forces outward against the filter surfaces. This internal balance gives a net increase in pressure on the top surface of the filter that is equal to the water depth less the tube depth. The preferred embodiment of the invention uses at least two layers of filter cloth tubes separated by a drainage structure of perforated pipes or other open matrix material such as honeycomb fitters.

The entire assembly is supported by a bottom drainage structure such as a layer of perforated pipes or an open matrix material in order to fully utilize the bottom area of the filter bag for creating a pressure differential between the internal pressure zone of the bag and the ambient pressure exterior to the bag. The layers of the filter doth material dramatically increase the filter area relative to the footprint area of the enclosure within which the filter is placed. The perforated pipes or open matrix material provide ambient pressure to the bag surfaces they support or separate and dramatically increase the effective pressure differential that is needed to allow flow through the filter surfaces.

The parallel tube bags are formed by simply stitching two layers of permeable filter material together with multiple parallel seams spaced at appropriate distances from each other. The drainage structures of perforated pipes or open matrix material are then positioned between the layers of parallel tubes adjacent to the parallel seams of the layers to separate the layers and to provide drainage for liquid coming out of the filter tubes. A bottom drainage structure is located below the seams of the lowest layer, supports the entire bag assembly, and provides drainage for the lower group of filter tubes plus any liquid that might descend from other tubes. When pipes are used for drainage structures they are perforated along their entire lengths and have at least one open end to provide liquid flow away from the filter assembly. The assembly of fitter tubes and drainage structure is held together by straps around the filter tubes and the drainage structure, and straps are also provided to facilitate lifting the filter assembly and to secure the filter assembly to the enclosure around the filter assembly. The straps can be attached to the filter bags by sewing them to the filter doth.

The entire filter assembly is located within a container, which is typically concrete, so that it can easily be located in the ground without concern for being affected by ground conditions. In the preferred embodiment of the invention, the container has a removable lid for access to the filter, a floor with an enclosure drainage structure such as a pipe grid or a drainage matrix to support the filter assembly, and it provides drainage to an appropriate drainage field or outlet pipe.

The present invention thereby provides a reliable contaminant and sediment bag filter in a minimum of space, and the filter bag can easily be removed from its container for replacement of the filter and disposal of the trapped materials.

DETAILED DESCRIPTION OF THE INVENTION

Figure 1:
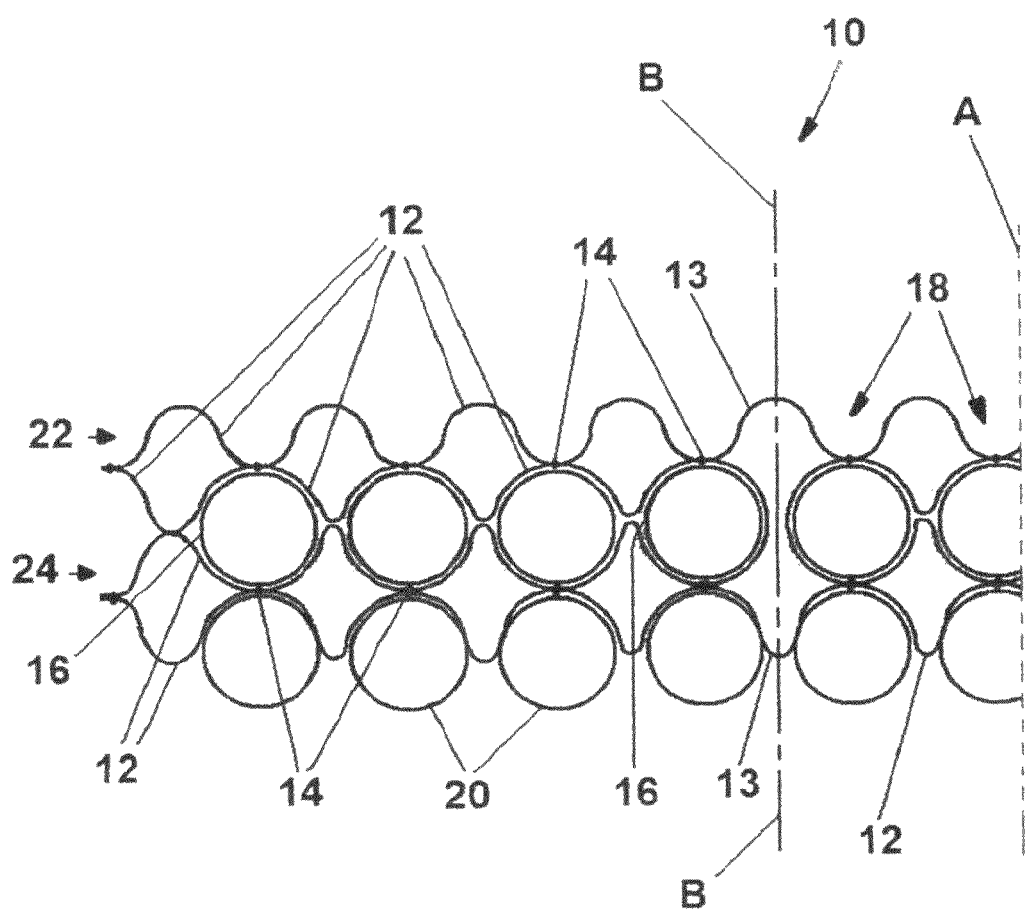
FIG. 1 is a schematic sectional view at section line C-C of FIG. 2 of a portion of the filter assembly of the preferred embodiment of the invention.
Figure 2:
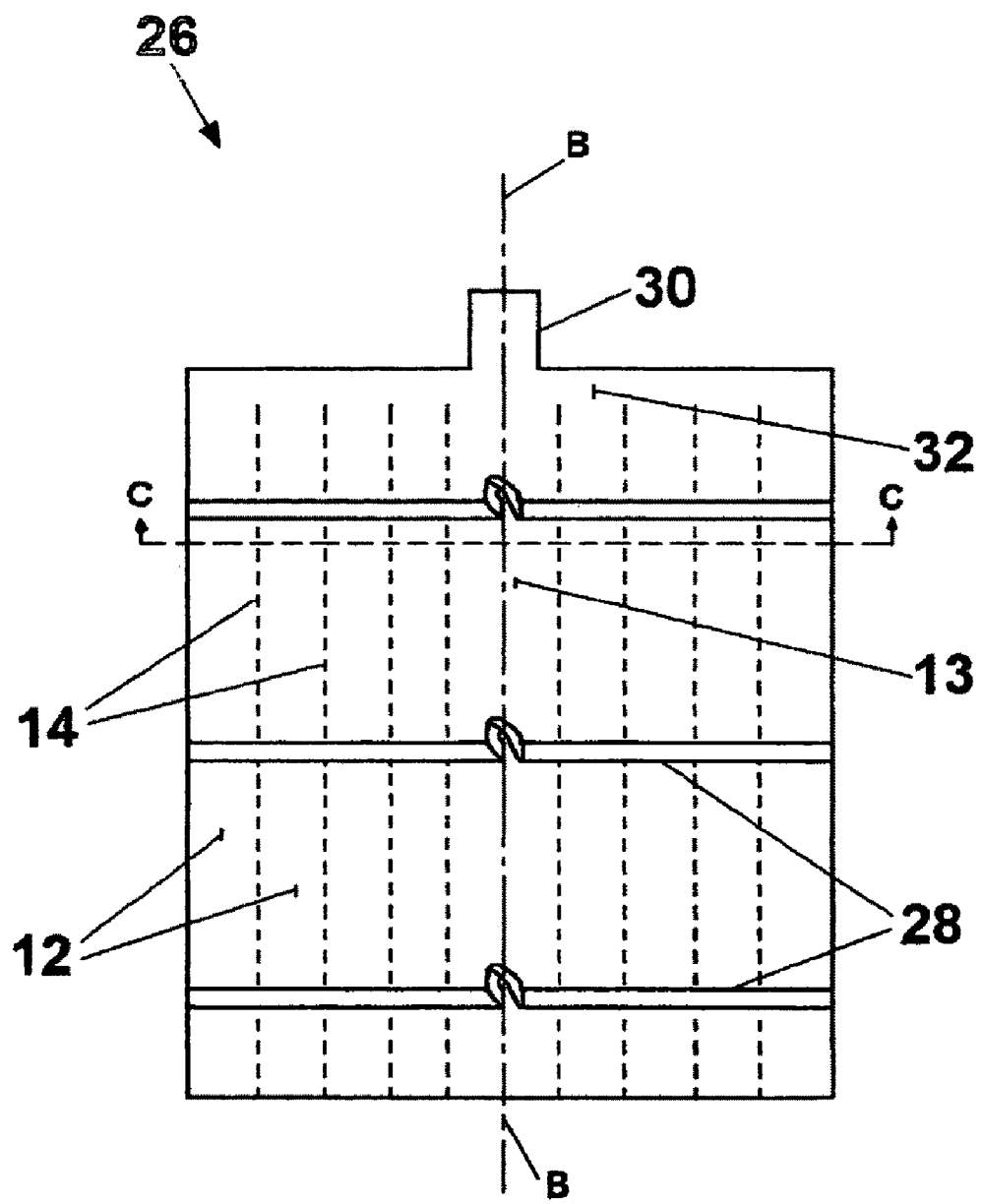
FIG. 2 is a schematic plan view of the filter bag of the preferred embodiment of the invention before installation into the filter assembly.

FIG. 1 is a schematic sectional view at section line C-C of FIG. 2 of a portion of the filter assembly 10 of the preferred embodiment of the invention. There are additional filter tubes 12 which project to the right of line A in FIG. 1, but they are mere repetitions of those seen in FIG. 1. Filter tubes 12 are made of filter material that is permeable to liquid, and which in the preferred embodiment of the invention has filter openings of 0.150 mm and a water flow rate of 6 gallons per minute per square foot. Such material is available from TenCate Geotube of Commerce, Ga. and is designated GioLon GT 1000. Filter tubes 12 and 13 are made from sheets of the permeable material which are joined together by seams 14 that are spaced apart by appropriate distances to form parallel tubes of the desired size. In the preferred embodiment the seams are sewn with thread designated B-138 bonded Kevlar by Cansew, Inc. of Montreal, Quebec, Canada. Tube 13 is configured to actually be the equivalent of two tubes, one in each layer of tubes. It thus serves to provide distribution of water to the top, middle, and bottom surfaces of filter assembly 10.

As shown in FIG. 1, which is part of the cross-section at C-C in FIG. 2, perforated pipes 16 are located within creases 18 located between filter tubes 12, and they collect filtered water from the filter tubes. Bottom drainage structures, which are lowest perforated pipes 20, not only collect filtered water from the adjacent filter tubes, but also support entire filter assembly 10. In the preferred embodiment of the invention, perforated pipes 16 and 20 are 4 inch diameter pipes constructed of high density polyethylene.

A typical single layer of filter tubes such as layer 22 is 12 feet long, 7 feet wide, and when in use, each layer and its supporting perforated pipe are approximately 8 inches high. One benefit of the invention is quite clear when two layer filter assembly 10 such as shown in FIG. 1, provides 336 square feet of filter area with a footprint of only 84 square feet. However, a very important benefit of the present invention is that the material filtered out of the stormwater is all trapped in filter tubes 12 of assembly 10 of the present invention so that filter assembly 10 can easily be removed and the trapped material disposed of properly.

FIG. 2 is a schematic plan view of filter bag 26 of the preferred embodiment of the invention before installation into filter assembly 10. A benefit of filter bag 26 of the present invention is that it is virtually flat and therefore makes transportation very simple. It should be appreciated that filter bag 26 can represent a single layer bag or a multiple layer bag with the layers joined together by one or more larger tubes 13 as shown in FIG. 1 and FIG. 2, and can also be considered as lateral wings joined together at and extending from larger tubes 13.

FIG. 2 shows several features which are not visible in FIG. 1. Straps 28 which are attached to filter bag 26, preferably by sewing, serve not only as a means to lift filter bag 26, but are also used to hold together entire filter assembly 10 (FIG. 1), including perforated pipes 16 and 20. Thus, filter assembly 10 can be lifted out of its container (see FIG. 3) even when it is loaded with collected sediment. FIG. 2 also shows that, when filter bag 26 lies flat, tube 13 is wider than standard tubes 12, thus permitting it to expand both up and down when in use.

The system for distribution of stormwater within filter bag 26 is also shown in FIG. 2. Stormwater is furnished to filter bag 26 through sleeve 30 which is attached to a feed pipe (see FIG. 3) and supplies the stormwater to manifold 32. When filter bag 26 includes more than a single layer of tubes or additional layers of filter tubes are used, manifold 32 connects to each layer and merges with sleeve 30. Sleeve 30 branches out to manifold 32 of each layer of filter bag 26 and can be attached to a single feed pipe. Manifold 32, which has access to all the filter tubes of each layer in filter bag 26, is formed in filter bag 26 itself and distributes stormwater to all the filter tubes of each layer.

Figure 3:
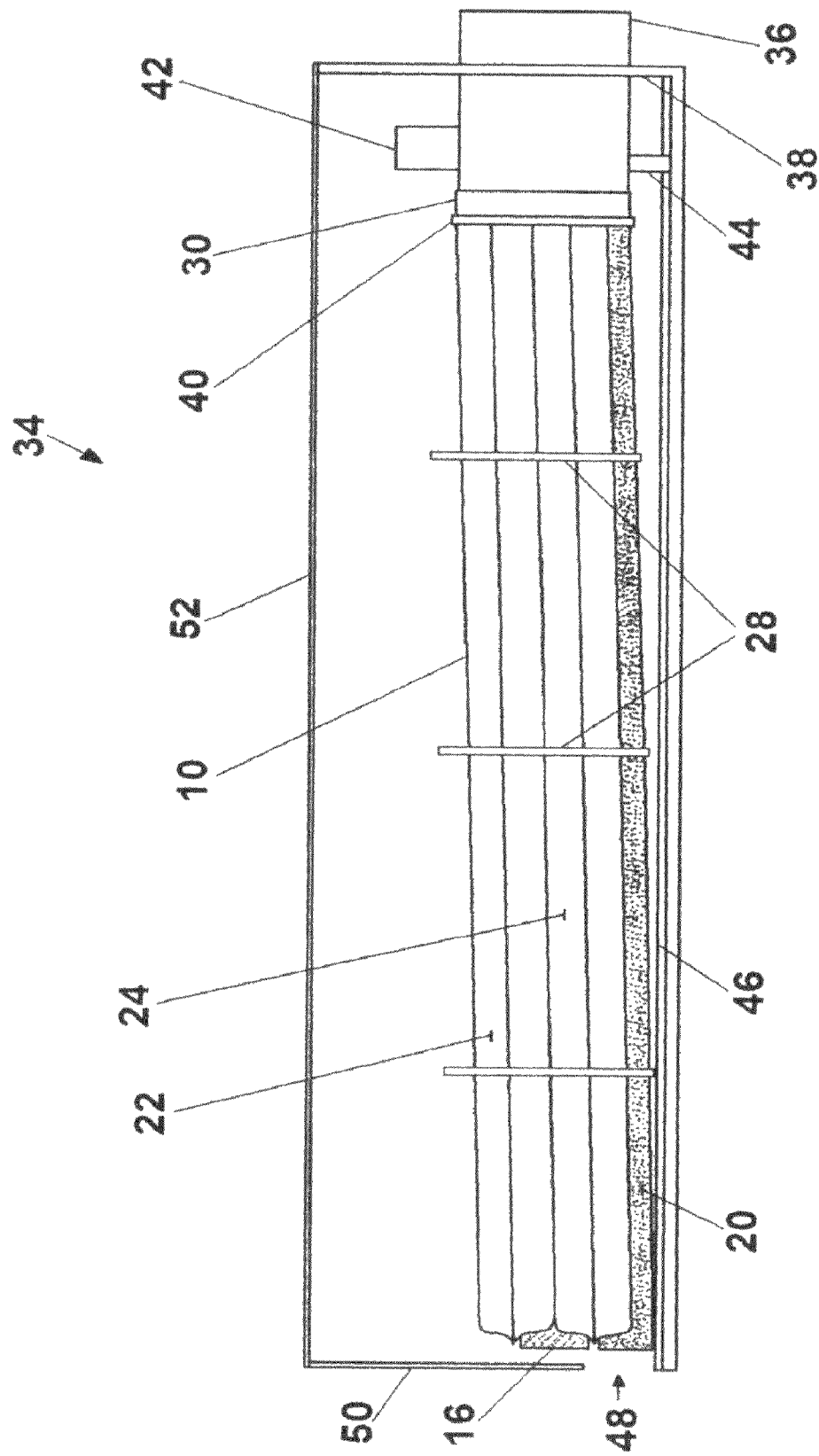
FIG. 3 is side elevation view of the filter assembly container of the preferred embodiment of the invention, with the container's near side removed for ease of viewing the filter assembly.

FIG. 3 is side elevation view of filter assembly container 34 of the preferred embodiment of the invention with the container's near side removed for ease of viewing filter assembly 10 within container 34.

Container 34 is a simple rectangular prism with dimensions to properly enclose filter assembly 10. In the preferred embodiment of the invention which includes filter tube layers 22 and 24 shown in FIG. 1, the interior dimensions of container 34 are 7 feet wide, 19½ feet long, and 4½ feet high.

Feed pipe 36, which penetrates wall 38 of container 34, furnishes stormwater to filter assembly 10 through filter doth sleeve 30. Sleeve 30 is attached to feed pipe 36 by strap 40 that can easily be detached for removal and replacement of filter assembly 10. Open top stand pipe 42 extends from the top of feed pipe 36 and serves as an overflow if filter assembly 10 becomes full of trapped material before it is replaced. Support 44 is located under feed pipe 36 to raise the input end of filter assembly 10 to maintain clearance to install the strap 40 and assure that there is sufficient slope to drain liquids throughout the filter tubes of filter assembly 10 and to the open ends of perforated pipes 16 and 20. Optional open grating 46 can also be installed along the bottom of container 34 to lift filter assembly 10 off the bottom and assure that liquid along the bottom of the container also flows out. Opening 48 is located at the lowest part of end wall 50 to permit liquids to empty from container 34.

Straps 28 are also shown in FIG. 3. They are attached to the uppermost layer of filter tubes and wrapped around the layers of tubes and the perforated pipes to both hold filter assembly 10 together and enable it to be lifted into and out of container 34.

Cover 52 of container 34 serves to prevent external debris from contaminating the filtered water within container 34. Cover 52 must, of course, be removable to permit the replacement of filter assembly 10.

The present invention thereby provides a contaminant and sediment bag filter assembly with maximum yield of effective filter area for the available height with a small footprint, and the filter assembly can easily be removed from its container for replacement of the filter and disposal of the trapped materials.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. A stormwater filter assembly comprising:
    permeable filter material formed into at least two layers of multiple parallel permeable tubes, with the tubes open at a first end, closed at a second end, and separated from each other by creases;
    drainage structures positioned in the creases between the tubes and separating the layers from adjacent layers;
    a layer of bottom drainage structures located below the lowest layer of tubes, positioned in the creases between the tubes, and supporting all the layers of tubes and pipes;
    means for forming the layers of tubes and the drainage structures into one assembly;
    means for lifting the filter assembly; and
    means for supplying stormwater to the open ends of the tubes.

2. The stormwater filter assembly of claim 1 wherein the creases are formed by sewing together two layers of the permeable filter material.

3. The stormwater filter assembly of claim 1 wherein the means for forming the layers of tubes and the drainage structures into one assembly comprises straps attached to the uppermost layer of tubes and wrapped around the layers of tubes and drainage structures.

4. The stormwater filter assembly of claim 1 wherein the means for forming the layers of tubes and drainage structures into one assembly comprises straps attached to the uppermost layer of tubes and wrapped around the layers of tubes and drainage structures, and the straps also provide the means for lifting the filter assembly.

5. The stormwater filter assembly of claim 1 wherein the means for supplying stormwater to the open ends of the tubes is a manifold formed within the permeable filter material, adjacent to the open ends of the tubes, and connected to a stormwater feed pipe.

6. The stormwater filter assembly of claim 5 wherein the stormwater feed pipe includes an open top stand pipe that extends from the top of the feed pipe and serves as an overflow.

7. The stormwater filter assembly of claim 1 wherein the filter assembly is enclosed within a container which has a removable top to enable removing the filter assembly.

8. The stormwater filter assembly of claim 1 wherein the filter assembly is enclosed within a container which has a removable top to enable removing the filter assembly and an opening located at the lowest part of a wall to permit liquids to empty from the container.

9. The stormwater filter assembly of claim 1 wherein the drainage structures are perforated pipes.

10. The stormwater filter assembly of claim 1 wherein the drainage structures are constructed of open matrix material.

* * * * *